July 3, 1962
C. M. GOODWIN
3,041,681
WEATHER STRIP
Filed Jan. 27, 1960
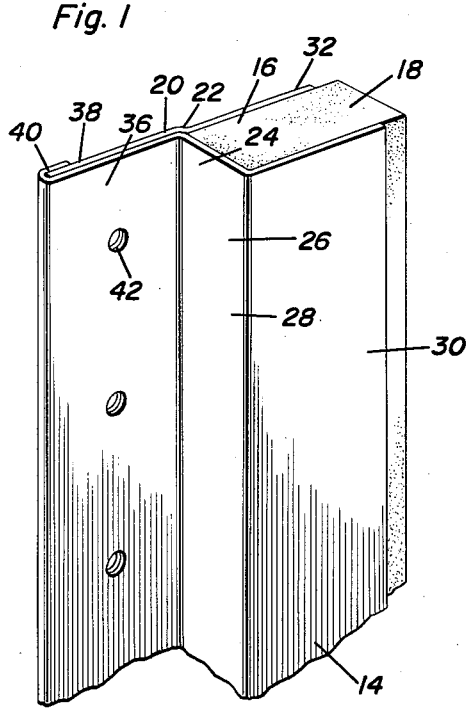
Fig. 1
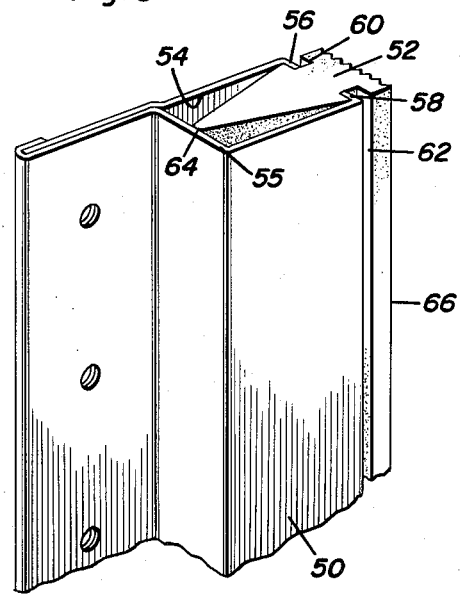
Fig. 3
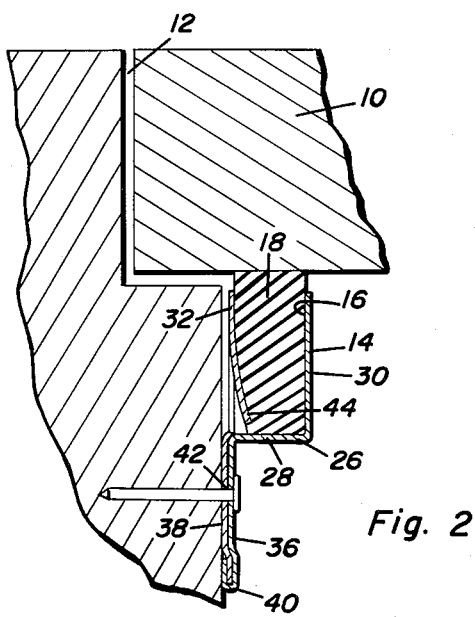
Fig. 2
Fig. 4
Charles M. Goodwin
INVENTOR.

United States Patent Office 3,041,681
Patented July 3, 1962

3,041,681
WEATHER STRIP
Charles M. Goodwin, Rte. 2, Mount Vernon, Ohio
Filed Jan. 27, 1960, Ser. No. 4,967
2 Claims. (Cl. 20—69)

This invention relates to weather strips and more particularly to weather strips adapted to be used with doors or other types of closures.

An object of the invention is to provide a structurally and functionally improved weather strip.

Briefly, the invention is embodied in a weather strip which is so constructed that the cushion exerts a continual pressure against the door, window, etc., with which it is connected.

One of the important features of the invention is found in the longevity of the strip. It is made in such a way that the useful life of the cushion is considerably extended because there are means incorporated in the construction of the weather strip for applying a yielding force against the closure or the like with which it is associated. This eliminates the great crushing effect now resorted to in ordinary weather strip insulations.

One of the advantages of a weather strip in accordance with the invention is that it seals much more effectively than an ordinary weather strip which does not possess the feature of applied force as well as the inherent resilience in the pad of the strip.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of the weather strip.

FIGURE 2 is a cross sectional view showing the weather strip of FIGURE 1 in use.

FIGURE 3 is a fragmentary perspective view of another form of the weather strip.

FIGURE 4 is a cross sectional view of the weather strip of FIGURE 3 showing it in use.

In the accompanying drawings reference is first made to FIGURES 1 and 2. Although door 10 and door jamb 12 are illustrated as one possible use of weather strip 14, it is to be clearly understood that the door and door jamb are merely diagrammatic and that the weather strip 14 may be applied wherever a weather strip of this type has utility.

Weather strip 14 may be made of metal or plastic and is configured to form a holder comprising a channel member 16 in which weather or sealing strip pad 18 is disposed. The weather strip pad may be made of felt, foam rubber, molded rubber, extruded rubber or any other elastomeric or suitable substance. The pad 18 is rectangular in cross section, but this may be varied.

The weather strip body that forms channels 16 is constructed of an elongate inner panel 20 having a small offset 22 longitudinally thereof and between the two edges thereof. A second or outer panel 24 is made similarly, except offset 26 is in a direction opposite to offset 22 and is of considerably greater depth. The offset 26 forms an inner wall 28, while portion 30 of panel 24 at the outer edge of wall 28, forms a side wall of channel 16. The opposite wall 32 of the channel 16 is defined by a portion of panel 20.

The inner portion 36 of panel 24 is essentially flat and fits flush against a corresponding portion 38 of panel 20. An elongate clamp 40 formed of the U-shaped terminus of portion 36 engages a part of portion 38 and holds the two panels assembled. A group of nailing openings 42 are formed in the parallel and engaged portions 36 and 38, and these portions cooperate to form a nailing strip.

There are a plurality of tongues 44 (FIGURE 2) struck from the side wall 32 of the channels 16, and the tongues protrude inwardly of channel 16 to the greatest extent at the innermost reach of channel 16. The tongues 44 engage pad 18 to hold it in place within the channel and they also serve the important function of providing yielding stops to yieldingly oppose the inward movement of pad 18 with reference to channel 16. Consequently, the tongues 44 constitute yielding means by which to yieldingly oppose the inward movement of pad 18 when the door 10 is closed. The installation of weather strip 14 is identical to the installation of conventional weather strip (FIGURE 2).

Returning now to FIGURES 3 and 4, the weather strip 50 is very similar to the weather strip 14 with the possible exception that the pad 18 is reversible so that when one edge thereof becomes worn, it may be removed by simply pulling it from the channel 16 and replacing it, after inverting the weather strip. The pad 52 of weather strip 50 provides a major difference between the weather strips 14 and 50 in that the channel 54 and the nailing strip are practically identical to the corresponding parts of weather strip 14. There are inwardly directed folded or turned edges or the like forming flanges 56 and 58 at the outer edges of the sides of channel 54 in weather strip 50, and such flanges are not used in weather strip 14.

Flanges 56 and 58 engage in longitudinal slots 60 and 62 formed in the sides of pad 52. Further, the inner part of the pad is essentially triangular in cross section with the apex part 64 of the weather strip bearing against the inner wall of the channel 54. As shown as FIGURES 3 and 4 the flanges 56 and 58 fit loosely within slots 60 and 62 so that the pad 52 may move inwardly and outwardly with respect to the channel 54. Further, the flanges and slots define the limits of inward and outward movement of the weather strip pad 52 with respect to its channel 54.

The outer face 66 of the weather strip pad 52 may be serrated, scored or otherwise configured to enhance the frictional grip between door 10 and the pad 52. This is optional.

In the use of this form of the weather strip, the action is identical. Instead of using tongues 44 as the resilient means for opposing the inward movement of the weather strip pad 52, the inner part of the pad 52 serves the same purpose. The apical edge 64 of the weather strip pad 52 abuts the innermost wall 55 of the channel 54 and causes the pad to be longitudinally deformed. This yieldingly opposes the inward movement of the weather strip pad 52 with respect to its channel 54 and creates a much more effective seal with door 10. Further, great localized forces which would be generated in a case of a hard or rigid pad, are very considerably attenuated thereby prolonging the life of the weather strip pad 52.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A weather strip comprising a channel member for mounting on a jamb of a closure, said channel member including opposed side walls and an inner wall, a resilient sealing strip mounted in the channel member and including an outer longitudinal marginal portion protruding therefrom for engagement by the closure, said sealing strip having preformed longitudinal grooves in its sides, and inturned retaining flanges for the sealing strip on the free longitudinal edges of said channel member side walls engaged in the grooves and spaced from at least one of the side walls thereof for permitting limited free inward and outward movement of the sealing strip in the channel member, and means yieldingly urging the sealing strip outwardly in the channel member said means including a tapered, readily flexed inner longitudinal marginal portion freely operable in the channel member and engaged with said inner wall thereof for yieldingly resisting inward movement of said sealing strip in response to impact by the closure.

2. A weather strip comprising a holder for mounting on a jamb of a closure, said holder including a pair of opposed elongated inner and outer panels, said inner panel including a laterally offset, longitudinally extending portion receiving the opposed portion of the outer panel therein, said outer panel comprising a reversely bent longitudinal marginal portion interlockingly engaged with the corresponding longitudinal marginal portion of the inner panel for securing the panels together, said offset and said opposed portions of said inner and outer panels providing a mounting flange for the holder and having apertures therein for fasteners for securing said holder on the jamb, the other longitudinal marginal portion of the outer panel being laterally outwardly offset and defining, in conjunction with the opposed portion of said inner panel, a channel, a resilient sealing strip mounted in the channel and protruding therefrom for abutting engagement by the closure, and means for yieldingly securing the sealing strip in the channel, said sealing strip having preformed longitudinal grooves in its side portions, said securing means comprising inturned longitudinal flanges on the holder engaged in the grooves and spaced from at least one of the side walls thereof for permitting limited free inward and outward movement of the sealing strip in said holder, said sealing strip including a tapered, readily flexed inner portion freely operable in the channel and engaged with the inner wall thereof for yieldingly resisting inward movement of said sealing strip in response to impact therewith by the closure.

References Cited in the file of this patent
UNITED STATES PATENTS

| | | |
|---|---|---|
| 2,145,403 | Nemec | Jan. 31, 1939 |
| 2,211,257 | Deisley et al. | Aug. 13, 1940 |
| 2,613,617 | Dean | Oct. 14, 1952 |
| 2,769,215 | Neff | Nov. 6, 1956 |
| 2,771,165 | Bell | Nov. 20, 1956 |
| 2,903,758 | Hayman | Sept. 15, 1959 |
| 2,954,591 | Miles | Oct. 4, 1960 |

FOREIGN PATENTS

| | | |
|---|---|---|
| 540,076 | Canada | Apr. 23, 1957 |